United States Patent
Ritari et al.

(10) Patent No.: US 8,296,834 B2
(45) Date of Patent: Oct. 23, 2012

(54) SECURE SINGLE-SIGN-ON PORTAL SYSTEM

(75) Inventors: Daniel L. Ritari, Big Lake, MN (US); John P. Ashby, Blaine, MN (US)

(73) Assignee: Deluxe Corporation, Shoreview, MN (US)

(*) Notice: Subject to any disclaimer, the term of this patent is extended or adjusted under 35 U.S.C. 154(b) by 1008 days.

(21) Appl. No.: 12/184,741

(22) Filed: Aug. 1, 2008

(65) Prior Publication Data

US 2009/0172795 A1    Jul. 2, 2009

Related U.S. Application Data

(60) Provisional application No. 60/935,243, filed on Aug. 2, 2007.

(51) Int. Cl.
*H04L 9/32* (2006.01)
*G06F 21/20* (2006.01)

(52) U.S. Cl. ............................................ 726/8; 726/27

(58) Field of Classification Search .................. None
See application file for complete search history.

(56) References Cited

U.S. PATENT DOCUMENTS

| | | | |
|---|---|---|---|
| 2004/0139328 A1 | 7/2004 | Grinberg et al. | |
| 2004/0158746 A1 | 8/2004 | Hu et al. | |
| 2004/0250118 A1* | 12/2004 | Andreev et al. | 713/201 |
| 2005/0108396 A1* | 5/2005 | Bittner | 709/225 |
| 2006/0129835 A1 | 6/2006 | Ellmore | |
| 2006/0218630 A1* | 9/2006 | Pearson et al. | 726/8 |
| 2007/0130463 A1 | 6/2007 | Law et al. | |
| 2007/0186277 A1* | 8/2007 | Loesch et al. | 726/4 |
| 2007/0265929 A1* | 11/2007 | Danninger | 705/26 |

OTHER PUBLICATIONS

International Search Report and Written Opinion mailed on Nov. 3, 2008, directed to counterpart International Patent Application No. PCT/US08/72079; 9 pages.

\* cited by examiner

*Primary Examiner* — Venkat Perungavoor

(74) *Attorney, Agent, or Firm* — Morrison & Foerster LLP

(57) ABSTRACT

A computer-implemented portal system facilitates access to secure data and multiple secure-access internet sites. The system authenticates a user based on a single-sign-on identifier (ID) and password. The system stores user authentication information for the secure-access internet sites so that once the user is authenticated, the system can automatically authenticate the user to the sites, thus allowing the user to access multiple secure sites after a single manual authentication.

18 Claims, 18 Drawing Sheets

DeluxeID LOGIN

* DeluxeID: [_____]

* PASSWORD: [_____]

[ CONTINUE ]

* = REQUIRED FIELD

— 205

DeluxeID TWO-FACTOR AUTHENTICATION

* CREDENTIAL: [ ] [ ] [ ]

[ LOGIN ]

* = REQUIRED FIELD

| Account | Access control |
|---|---|
| MY FINANCES | |
| Bank X | J, L |
| Bank Y | J, L |
| MEDICAL | |
| HealthPartners | J, L |
| Scott | J, L |
| Todd | J, L |
| KIDS' FINANCES | |
| Scott's Savings | J, L, S |
| Todd's Savings | J, L, T |
| MOM'S FINANCES | |
| Mom's Credit Card | J, L, M |
| MY BILLS | |
| My Car Loan | J, L |
| Lynn's Car Loan | J, L |
| My Credit Card | J |
| Lynn's Credit Card | L |
| RECREATION | |
| Golf World | J |
| MY WORK | |
| My Work e-Mail | J |
| Deluxe ESS | J |

J = John

L = Lynn

S = Scott

T = Todd

M = John's Mother

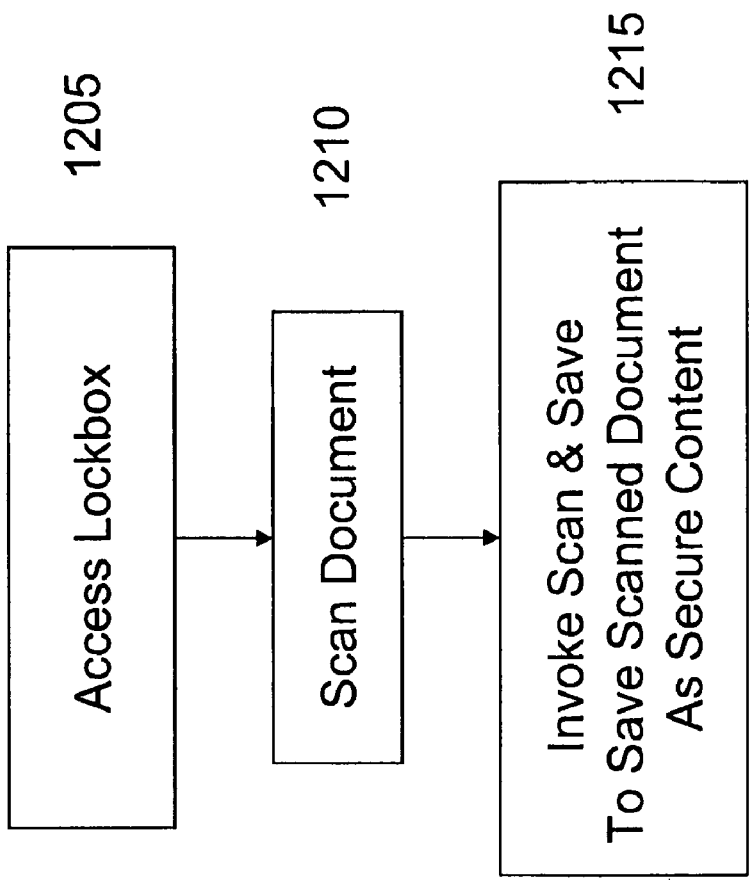

SECURE SINGLE-SIGN-ON PORTAL SYSTEM

CROSS-REFERENCE TO RELATED APPLICATIONS

This application claims priority to U.S. Provisional Patent Application No. 60/935,243, the disclosure of which is hereby incorporated by reference in its entirety.

BACKGROUND OF THE INVENTION

1. Field of the Invention

Embodiments of the claimed subject matter relate generally to electronic data security. More particularly, embodiments of the claimed subject matter relate to technologies providing secure access to electronic data via a network.

2. Description of Related Art

Nowadays, frequent internet users, for example, consumers and businesspeople, encounter secure sites when navigating the World Wide Web. However, secure sites generate and subsequently require a user to remember myriad user IDs and passwords, which may require periodic changes. In response, users have developed patterns designed for recalling passwords. One coping mechanism frequently relied upon is the repeated use of a familiar identifier (ID) and password combination. The familiarity captured in the password may be associated with the numbers of a user's birthday, a Social Security No., or the key terms or phrases associated with a favorite past-time. However, this practice is frowned upon from a security perspective.

As a result of the increasing use of the internet generally, credit reports, online transactions, and debit or credit cards by people to manage their daily lives, security threats have blossomed. More complex viruses, trojan horses, phishing schemes, and hacking incidents plague computer networks and individual computers than ever before. Therefore, businesses are heightening security complexity to guard against potential liabilities. While people and businesses have moved online, so too have would-be thieves. Every conceivable transaction from mortgage payments to library book renewals is done online. Thus, people have a vast number of relationships that require secure login. But with more relationships, comes more risk online. Thieves or hackers today use sophisticated methods to steal personal login and other nonpublic data and thus gain access to both identity and finances that are stored electronically.

In the alternative, a user may employ multiple user IDs and passwords that are recorded and stored in proximity to a personal PC or workstation. Each entity that is accessed via the internet requires different forms of identification, for example, a user ID/password may require eight characters containing uppercase and lowercase letters, a number, and a special character such as a question mark. People are retaining handwritten lists written on scraps of paper that are then kept in their possession so that they can remember all of their different logins and passwords. Invariably, those scraps of paper are misplaced. Thus, the lists themselves can present a significant risk to users and their financial resources.

But no coping mechanism for memory overload tends to be optimal for the sake of security or convenience. In other words, neither practice has proven practical or foolproof. And avoiding the internet altogether could prove too costly in terms of missed business opportunities or social connections.

From a corporate perspective, businesses are losing online customers because those potential customers are unwilling to invest time filling out lengthy registration forms. In the end, consumers wind up frustrated, while businesses squander potential revenue opportunities derived from e-commerce operations.

SUMMARY

Recognizing the above and other shortcomings of conventional electronic security technologies, embodiments of the claimed subject matter provide systems and methods allowing users to access secure electronic content using a single user ID and password combination.

Accordingly, embodiments may alleviate problems of security and convenience from both a consumer and a corporate standpoint. In addition, some embodiments may overcome issues of portability. For instance, whereas some password management solutions are resident and only useful on a single PC/device, example embodiments accommodate users who may desire secure access from many locations, including from home, work, mobile, and other locales.

According to one embodiment, a system comprises a single-sign-on user account accessible by a user providing a corresponding single-sign-on user identifier (ID) and password. The system further comprises a set of secure-access internet sites associated with the single-sign-on user account, a plurality of user ID and password combinations associated with the set of secure-access internet sites, and an access component configured to automatically enter the combinations into designated locations of the secure-access internet sites to allow the user to access the sites.

According to another embodiment a computer-readable medium stores a secure-sign-on portal program configured to pre-fill at least one login name and code combination for at least one secure-access internet site. The program comprises code for executing a method comprising judging whether a single-sign-on ID and a single-sign-on password are valid, accepting the single-sign-on ID and single-sign-on password when valid, and accessing a database to pre-fill the combination for at least one secure-access internet site. The database stores the combination as a result of prior activity of a user account associated with the single-sign-on ID and single-sign-on password.

According to still another embodiment, a method comprises receiving a single-sign-on identifier (ID) and password combination via a single-sign-on portal, and authenticating a user based on the combination. After the user is authenticated, a request is received from the user to access a particular secure-access internet site. After the request is received, a database is accessed. The database stores a plurality of user ID and password combinations for a corresponding plurality of secure-access internet sites. A particular user ID and password combination for the particular secure-access internet site are received from the database. Next, the particular user ID and password are filled into designated portions of the particular secure-access site.

BRIEF DESCRIPTION OF THE DRAWINGS

FIG. 2 shows an example two-factor authentication scheme that may be used to access a system such as that illustrated in FIG. 1.

FIG. 4 shows a table illustrating various accounts that may be accessed by different users through the same single-sign-on access portal based on the users' different roles.

FIGS. 5A and 5B show an example user home page that may be generated by the single-sign-on portal after a user performs a single-sign-on.

FIGS. 7A and 7B show a screen welcoming a user to a secure portion of a secure-access internet site.

FIG. 12 is a flow diagram illustrating an example method for uploading information to the system of FIG. 1 via a lockbox feature shown in the home page of FIGS. 5A and 5B.

DETAILED DESCRIPTION

Embodiments of the claimed subject matter are described below with reference to the attached drawings. These embodiments are provided as teaching examples and should not be construed to limit the scope of the claims.

In general, embodiments of the claimed subject matter relate to electronic security technologies providing users with single-sign-on access to several different sources of secure electronic data, such as secure internet sites and secure data storage. The term single-sign-on means that a user provides a single user ID and password combination to gain access to multiple sources of secure electronic data.

In some embodiments, the user performs a single-sign-on to log into a system that stores multiple previously submitted user IDs and passwords corresponding to different secure internet sites or data servers. Once the user has logged into the system, the system facilitates automatic access to the secure internet sites or data servers by automatically submitting the stored user IDs and passwords where necessary, such as at appropriate log in screens or dialog boxes.

Examples of typical secure electronic data sources include user accounts for financial institutions, shopping sites, information sites, or membership groups to which the user may belong. Membership groups may include, for example, community blogs or networking sites. Example systems as described herein can serve as management tools for the owners of such accounts, thus reducing the need for the users to memorize a separate password and user ID combination for each account.

The password and user ID combinations for various embodiments may include combinations for single or multi-factor authentication. For instance, they may include combinations for two-factor authentication in accordance with Federal Financial Institutions Examination Council (FFIEC) or other usage guidelines. Two-factor authentication provides stepped-up security over a password alone because the authenticating process requires something a user knows, for example, a password, in addition to something the user possesses physically or electronically, such as a smart card, a token, or a time varying security code. The FFIEC establishes uniform principles, standards, and report forms for federal investigation of financial institutions. The FFIEC comprises the Board of Governors of the Federal Reserve System (FRB), the Federal Deposit Insurance Corporation (FDIC), the National Credit Union Administration (NCUA), the Office of the Comptroller of the Currency (OCC), and the Office of Thrift Supervision (OTS). The council makes recommendations to promote uniformity in the supervision of financial institutions.

Figure 1:
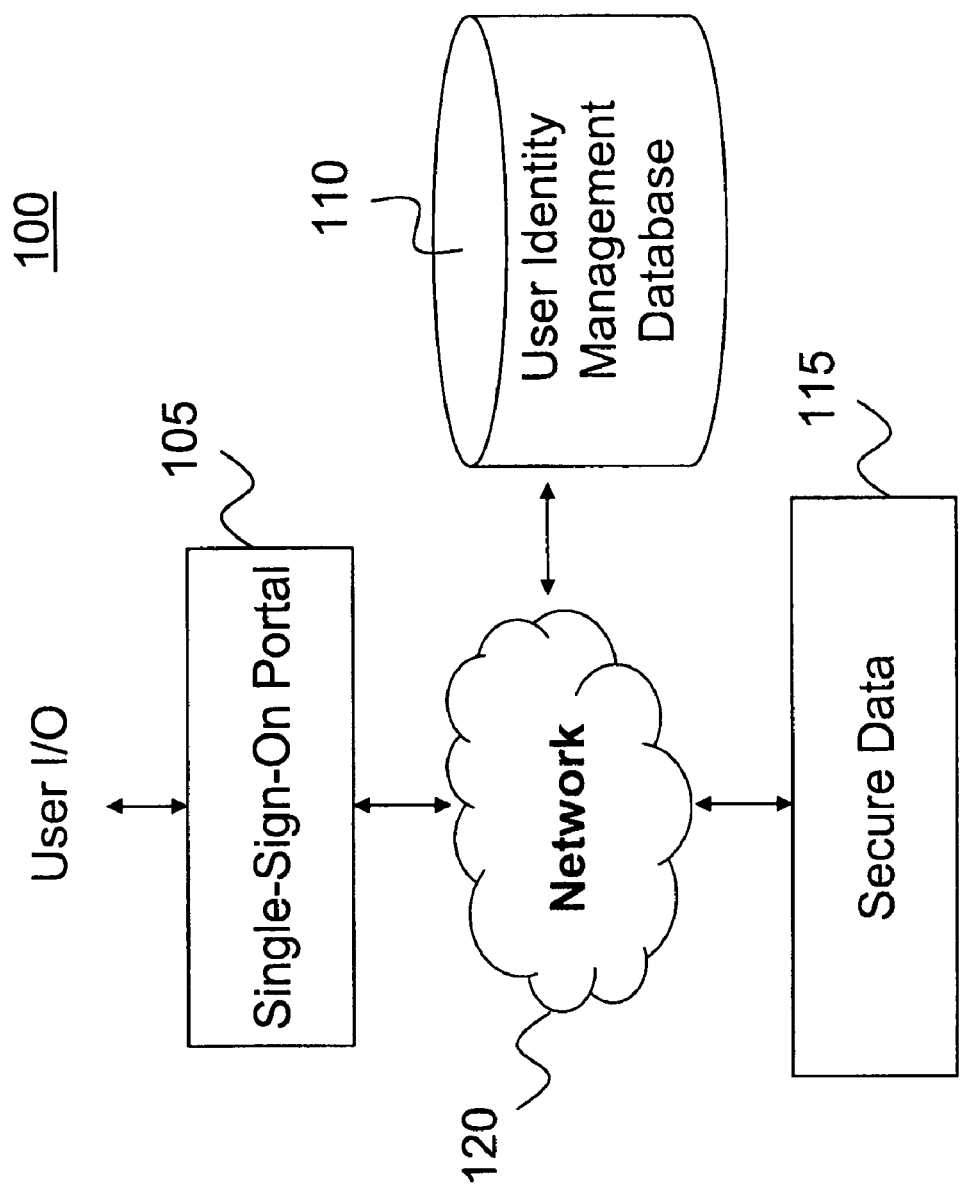
FIG. 1 illustrates a basic single-sign-on system in accordance with one embodiment.

FIG. 1 is a block diagram illustrating a basic single-sign-on system 100 in accordance with one embodiment. In the example of FIG. 1, a user interacts with system 100 through a single-sign-on portal 105. Single-sign-on portal 105 may be implemented, for instance, as a software application running on a personal computer.

The user logs into system 100 by supplying a user ID and password combination to single-sign-on portal 105, i.e., by performing a single-sign-on. Once the user is logged into system 100, portal 105 may present the user with multiple sources of secure data 115 available for user access based on the single-sign-on. For instance, portal 105 may present a customized home page including links to multiple secure internet sites and/or secure data servers that can be automatically accessed using passwords and user IDs stored within system 100.

The various types of information associated with a particular user of system 100 may be stored in a corresponding single-sign-on user account. Such information may include, for instance, the user ID and password used for single-sign-on access (i.e., the single-sign on ID and password), and other user IDs and passwords required to access secure data 115.

System 100 stores the user account information in a user identity management database 110. When the user attempts to access a particular source of secure data 115, portal 105 communicates with database 110 to retrieve the required user ID and password combination. Upon retrieving the combination, portal 105 provides the combination to the source of secure data 115 so that the user can access the data without having to recall the user ID and password combination.

In some embodiments, user identity management database 110 is populated with user ID and password combinations based on the user's manual access to various sites. For instance, if the user manually accesses a particular secure site for the first time by registering and/or entering a user ID and password, a background process associated with portal 105 may save the user ID and password in identity management database 110 so that the user ID and password can be automatically entered in the future.

In addition to providing automatic authentication, system 100 and other embodiments may also automatically handle changes to passwords. For instance, when a user attempts to access a particular internet site via portal 105, the internet site may generate a message indicating that the user must update the user's password for the site. Portal 105 may intercept the message and cause the password to be automatically updated in database 110 without any input from the user. Thus, the user is spared from having to constantly remember new passwords, and so on.

Secure internet sites may require such password changes on a periodic basis in order to strengthen security. Failure to update a password within a certain time period may result in the user temporarily or permanently being "locked out" of an account. Regardless of whether the period for change is monthly or quarterly, selected embodiments may be capable of generating a new password automatically for an account holder. Accordingly, embodiments may prevent users from being locked out of internet sites, while allowing secure internet sites to maintain the high level of security that accompanies regular password changes.

To prevent unauthorized access to sensitive information within system 100, such as stored user IDs and passwords, portions of system 100 may be implemented by highly secure data centers, such as those currently used by the CIA and the National Security Agency.

Because consumers tend to trust some companies (e.g., financial institutions) more than others, embodiments such as system 100 may be implemented with a portal branded by a trusted company. The company could then provide single-sign-on access to a variety of secure services through the portal.

FIG. 2 shows an example two-factor authentication scheme that may be used to access a system such as system 100. In the example of FIG. 2, the two-factor authentication scheme requires the user to enter a user ID and a password, as shown in a box 205, and then to enter an additional security code as shown in a box 210. The additional information may be chosen from a variety of sources, such as a security card or token, as described above. As alternatives to using an additional security code as shown in FIG. 2, the two-factor authentication could use other unique information such as biometric data. For instance, a user could be required to supply sample voice data or a fingerprint in order to access system 100.

In addition to the above features, system 100 and other embodiments may provide role-based access controls. A role-based access control is a mechanism for regulating secure data access among several users, where the users share one or more accounts. For example, a husband and wife may share one or more bank accounts, e-mail accounts, and so on. The husband and wife may additionally have access to accounts for their children. When the husband or the wife signs into system 100, portal 105 may present the husband or wife with links for accessing each of the shared accounts to which he or she has access, together with links to any non-shared accounts to which he or she has access.

Figure 3:
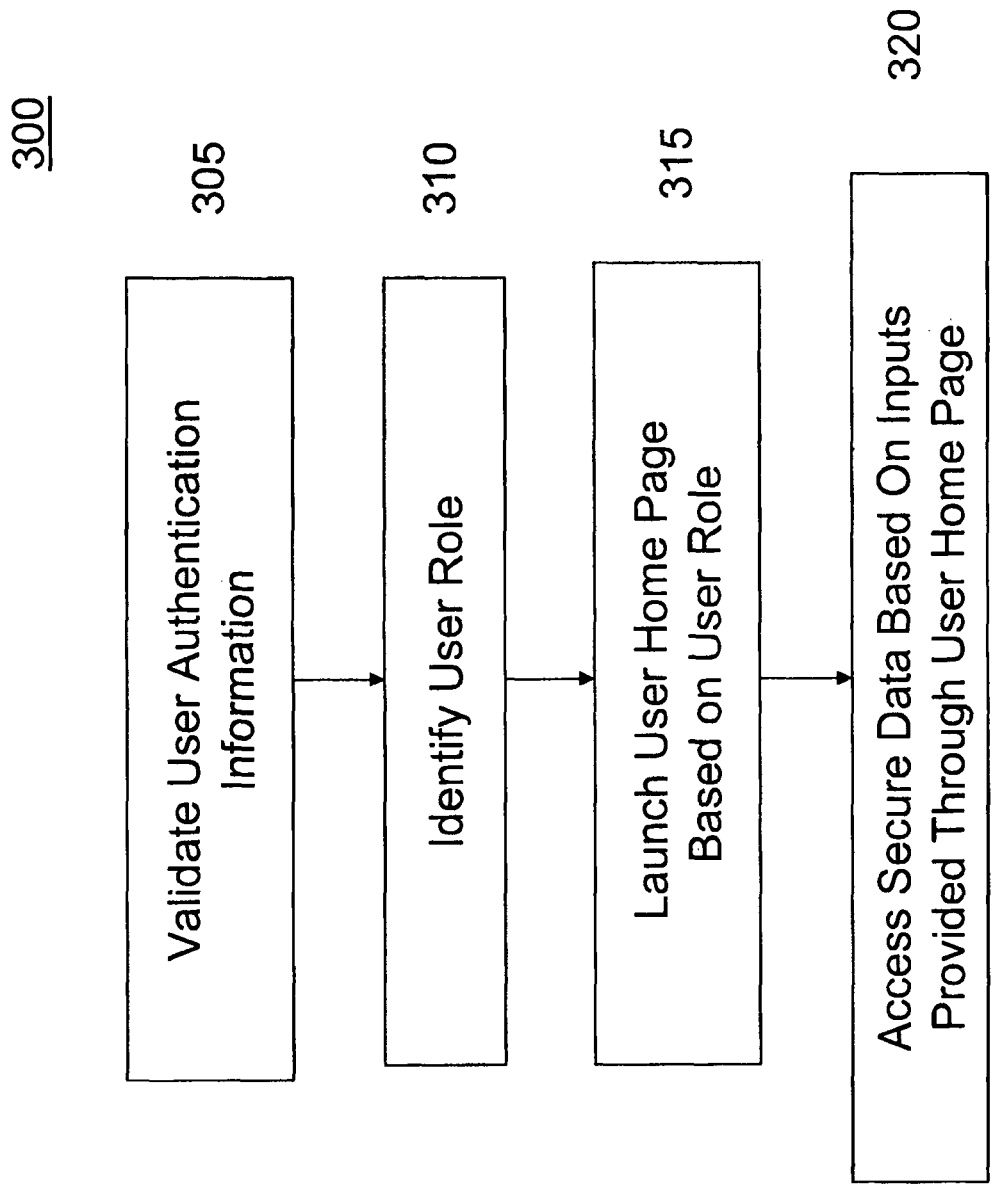
FIG. 3 illustrates the use of the system in FIG. 1 to access several secure accounts in accordance with role-based access controls.

FIG. 3 illustrates the use of system 100 to access several secure accounts in accordance with role-based access controls. In the description of FIG. 3 and elsewhere, example method steps are denoted by parentheses (XXX) to distinguish them from other features such as example system components.

Referring to FIG. 3, system 100 receives user authentication information such as a user ID, password, and an additional security code; based on the received information, system 100 validates the user (205). System 100 then identifies the user's role based on some or all of the authentication information (210), and launches a user home page based on the identified role (215). The user home page includes links to secure data that can be accessed by system 100 without requiring the user to supply additional authentication information. When the user selects any of the links, system 100 navigates the user to the corresponding secure data, and assists the user in accessing the data (220).

To illustrate the concept of role-based access controls in further detail, FIG. 4 shows a table illustrating various accounts that may be accessed by different users through the same single-sign-on access portal based on the users' different roles. In the example of FIG. 4, five different users have access to a variety of accounts. The five users include spouses John and Lynn, who share bank accounts, medical accounts, billing accounts, etc. John and Lynn also have two sons, Scott and Todd, with corresponding savings accounts. In addition, John helps manage an account for his mother, for whom John has power of attorney.

As illustrated by FIG. 4, bank accounts X and Y can be accessed by both John and Lynn. On the other hand, Scott's and Todd's respective savings accounts can be accessed by John, Lynn, and Scott and Todd, respectively. Other accounts shown in FIG. 4 can be accessed by the corresponding users indicated by the related letters.

Assuming that John accesses his accounts through a system such as system 100, John must first log onto the system by performing a secure-sign-on through portal 105. Upon signing on, John is presented with a personalized home page with links to all of the accounts labeled with a "J" in FIG. 4. System 100 can control the users' access to the accounts by maintaining a user login profile for each of the accounts. The user login profile may specify, for instance, which users can access the account. Alternatively, system 100 can maintain a profile for each user, wherein the profile stores information indicating which accounts can be accessed by the user.

Figure 5A:
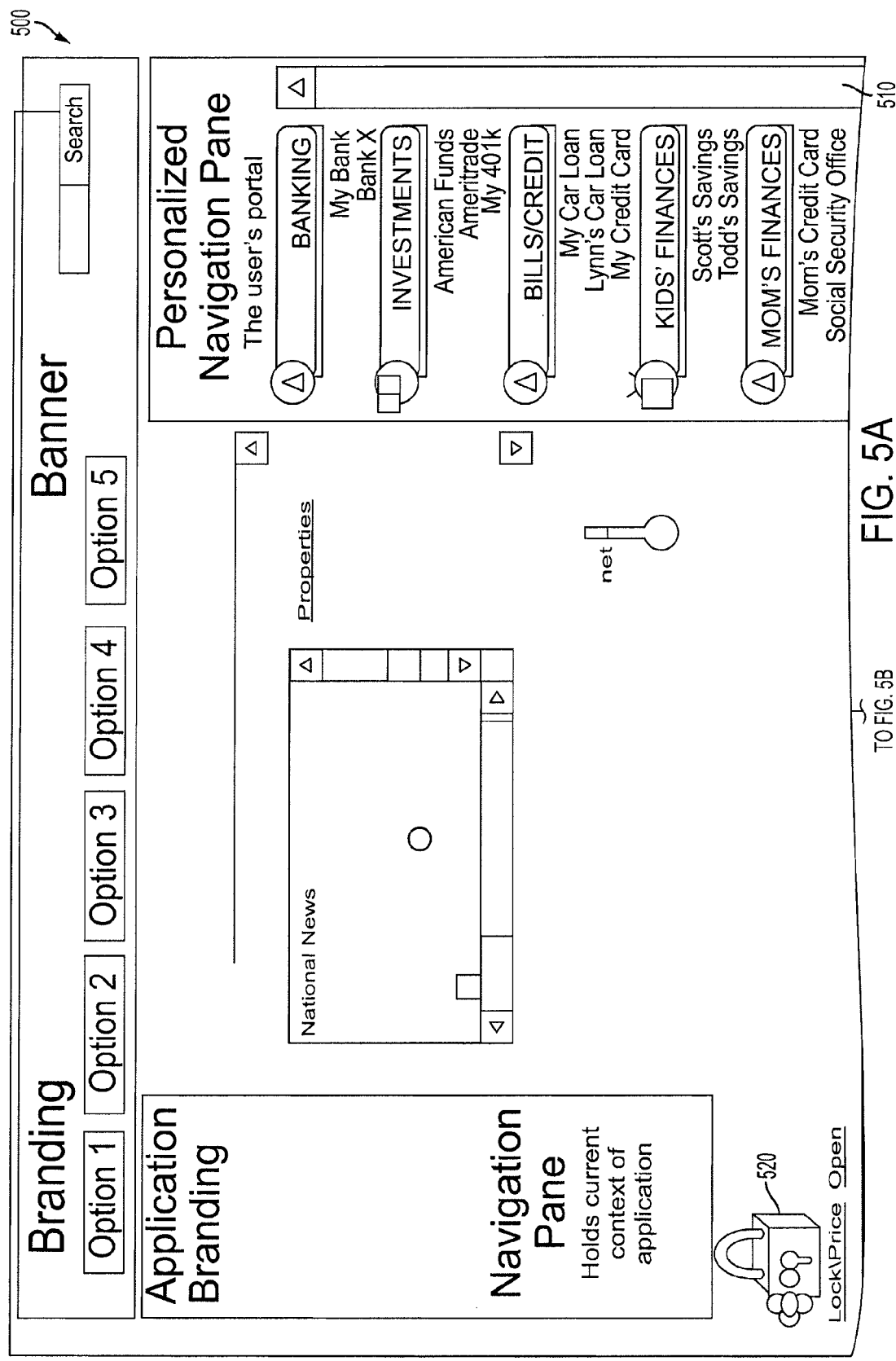
Figure 5B:
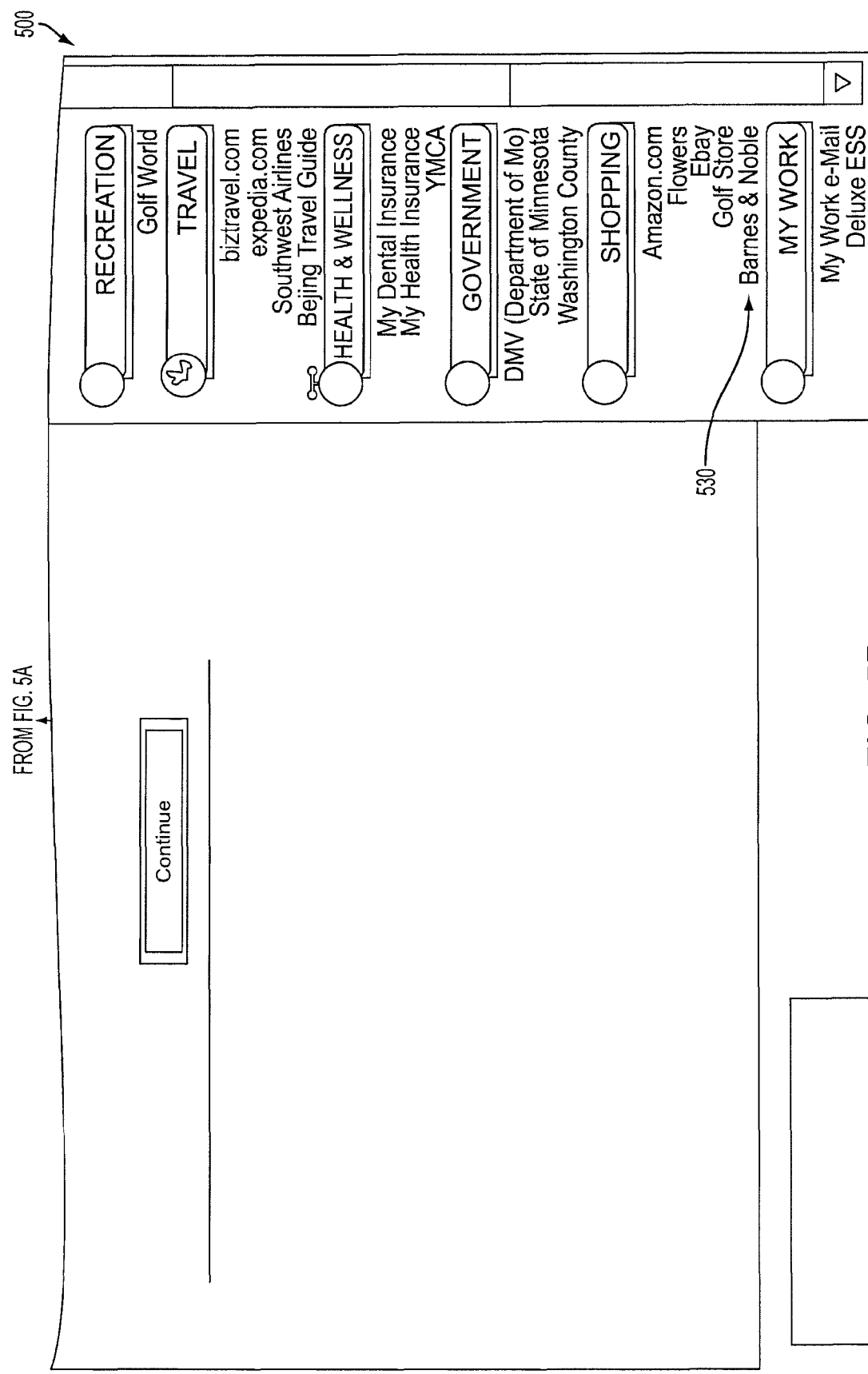

FIGS. 5A and 5B show an example user home page 500 that may be generated by portal 105 after a user performs a single-sign-on. Home page 500 includes multiple links 510 for accessing accounts associated with the user. For instance, home page 500 includes links for Bank X, Scott's and Todd's savings accounts, John's mother's credit card account, several online stores, and so on. In addition to the account links, home page 500 also includes a link 520 (labeled "Lockbox") allowing John to access secure personal data. John's personal data may include, for example, personal documents, records, memorabilia, and so on.

The top of home page 500 shows spaces where a hosting entity such as a financial institute may place information such as branding indicia, banners, or tag lines. Additionally, home page 500 includes a space beneath a "Continue" button to allow the hosting entity to communicate with consumers concerning particular products, features, promotions, or public service messages.

Figure 6A:
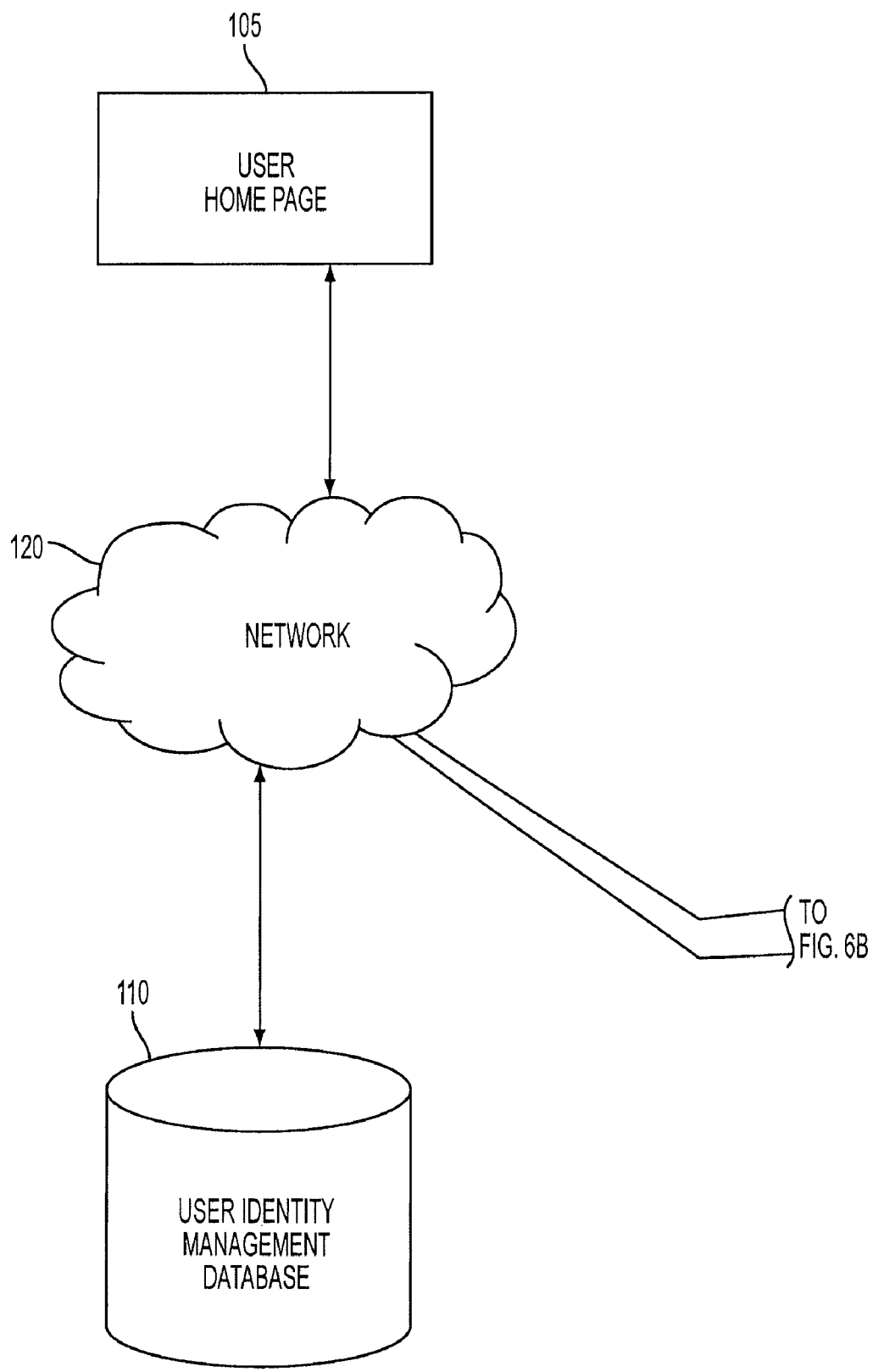
FIGS. 6A-6C illustrate an example screen that may appear when a user such as selects a links from the home page of FIGS. 5A and 5B.
Figure 6B:
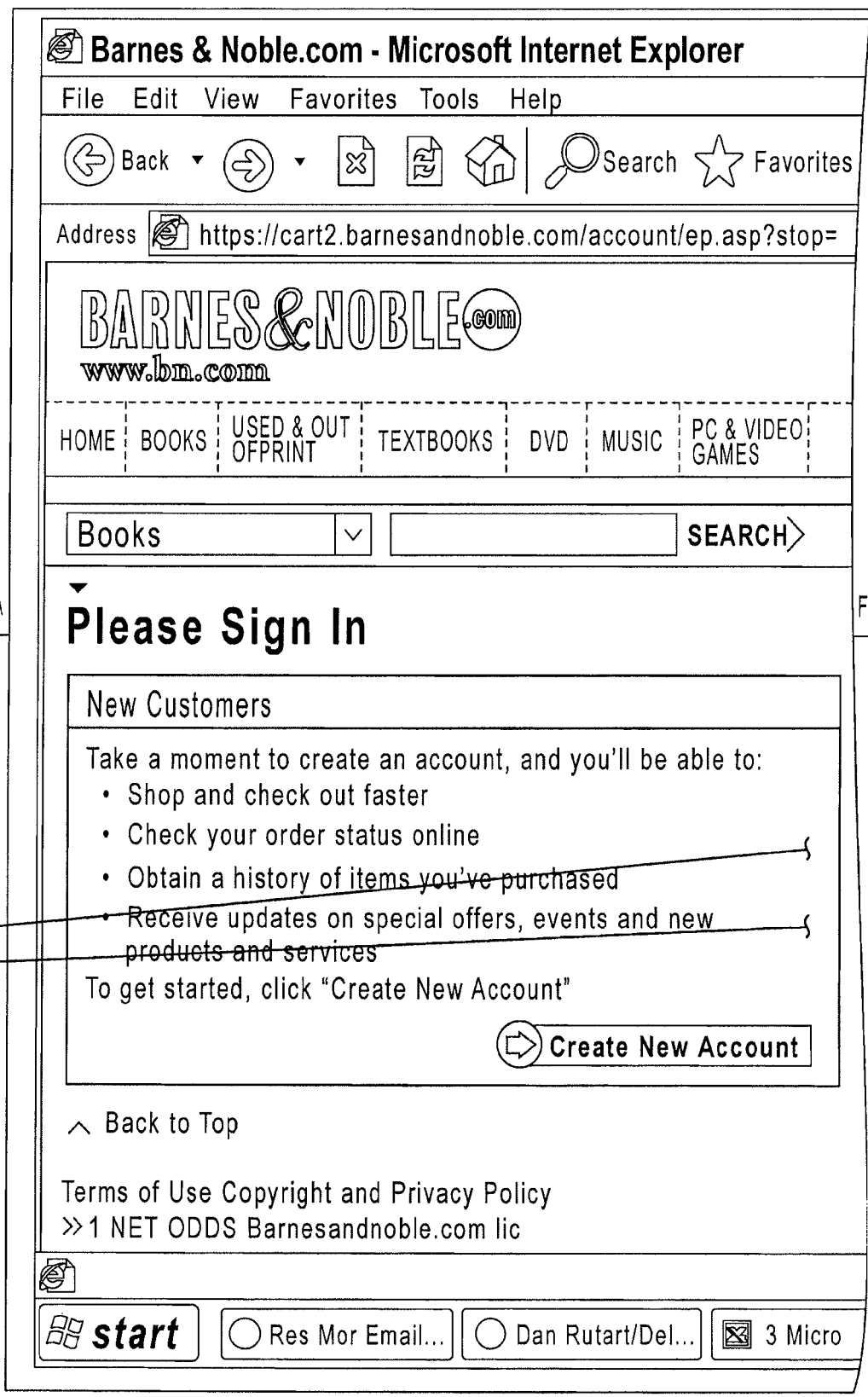
Figure 6C:
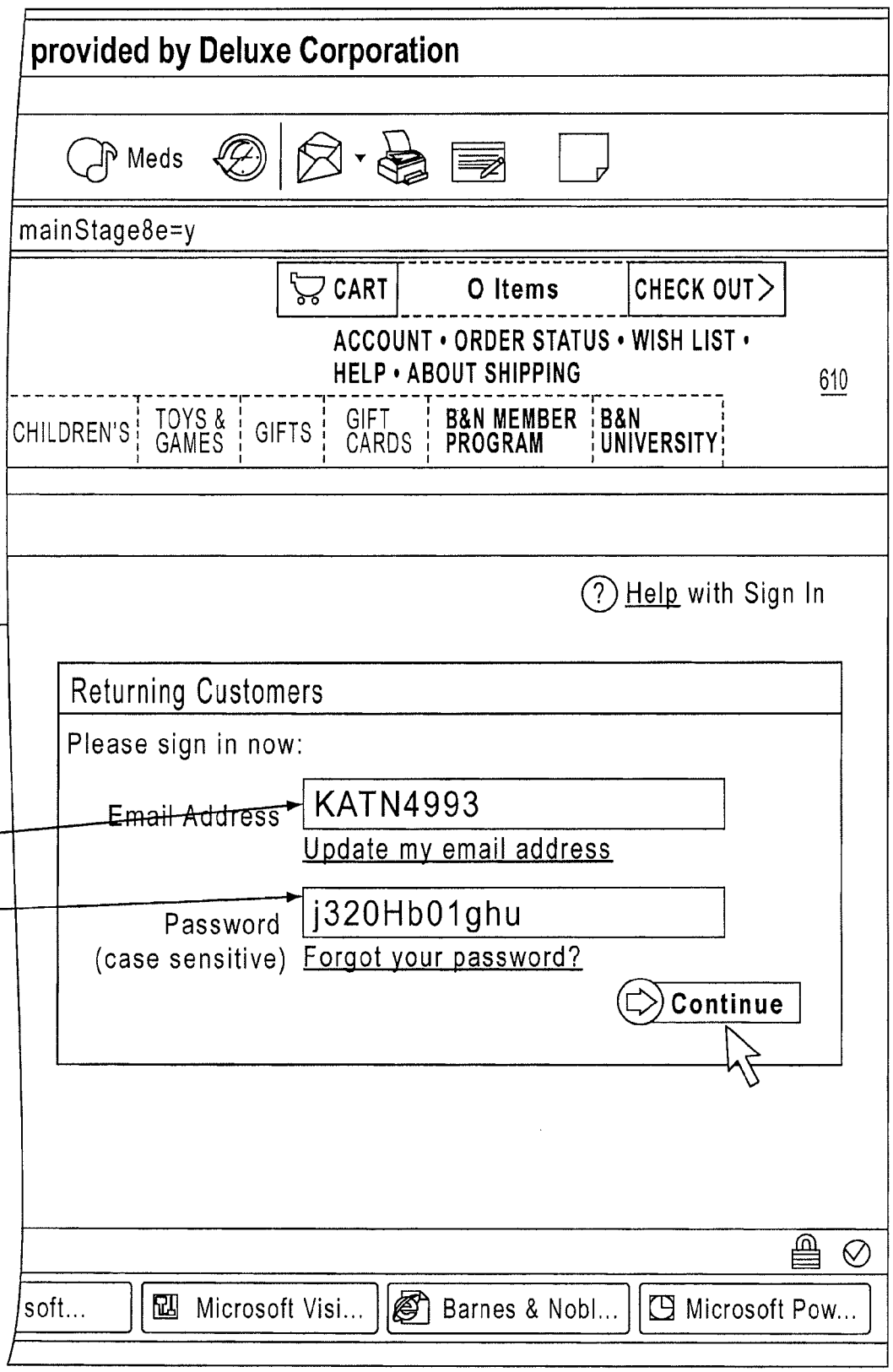

FIGS. 6A-6C illustrate an example screen 610 that may appear when a user such as John selects one of the links from home page 500. More particularly, the example screen 610 is displayed when John selects a link 530, which corresponds to his user account for barnesandnoble.com. As indicated by FIGS. 6A-6C, the user home page (presented within portal 105) receives John's selection of link 530, retrieves the corresponding user ID and password from database 110, and then enters the retrieved information in a login portion of barnesandnoble.com. Accordingly, John can access his account without remembering the corresponding user ID and password.

Figure 7A:
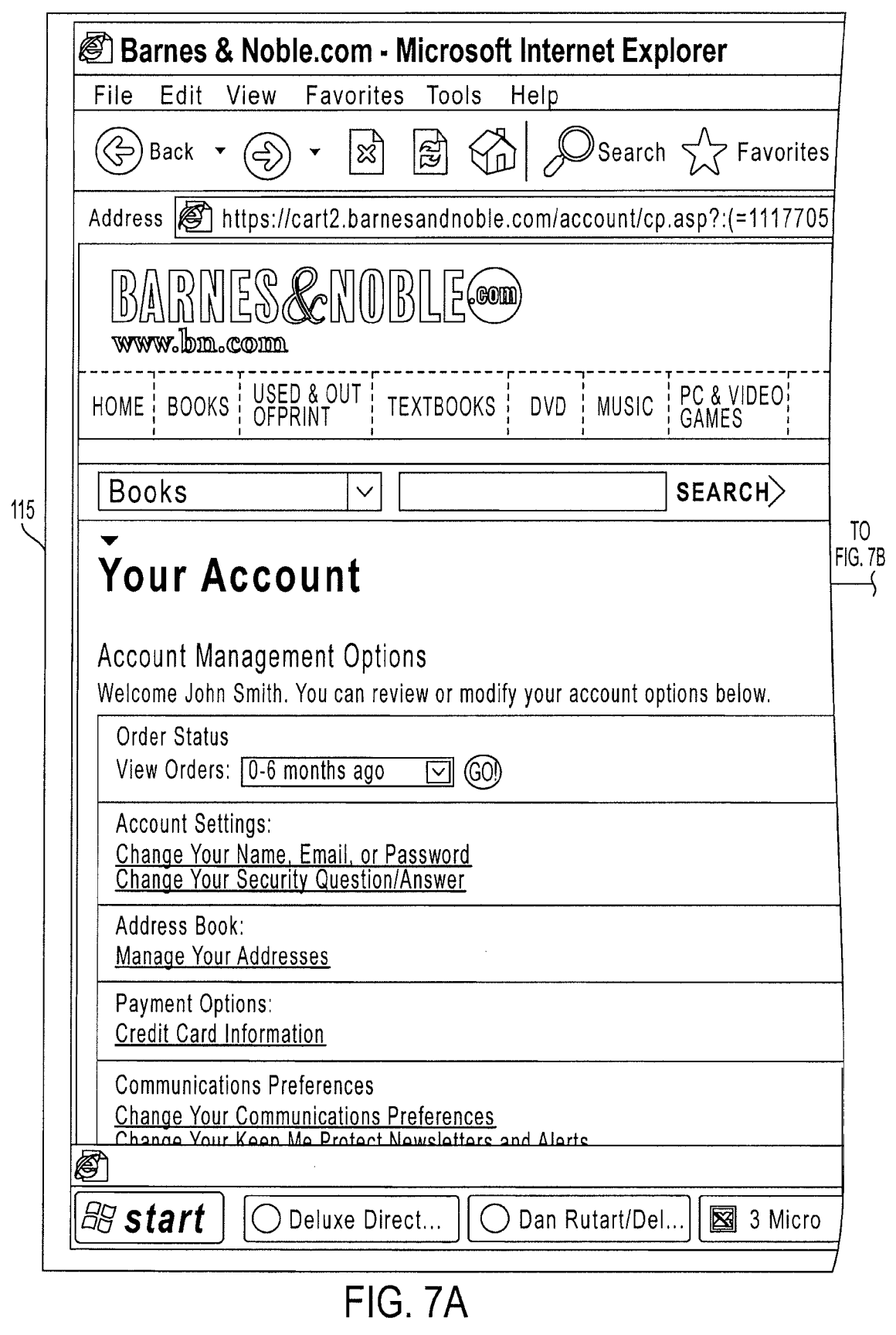
Figure 7B:
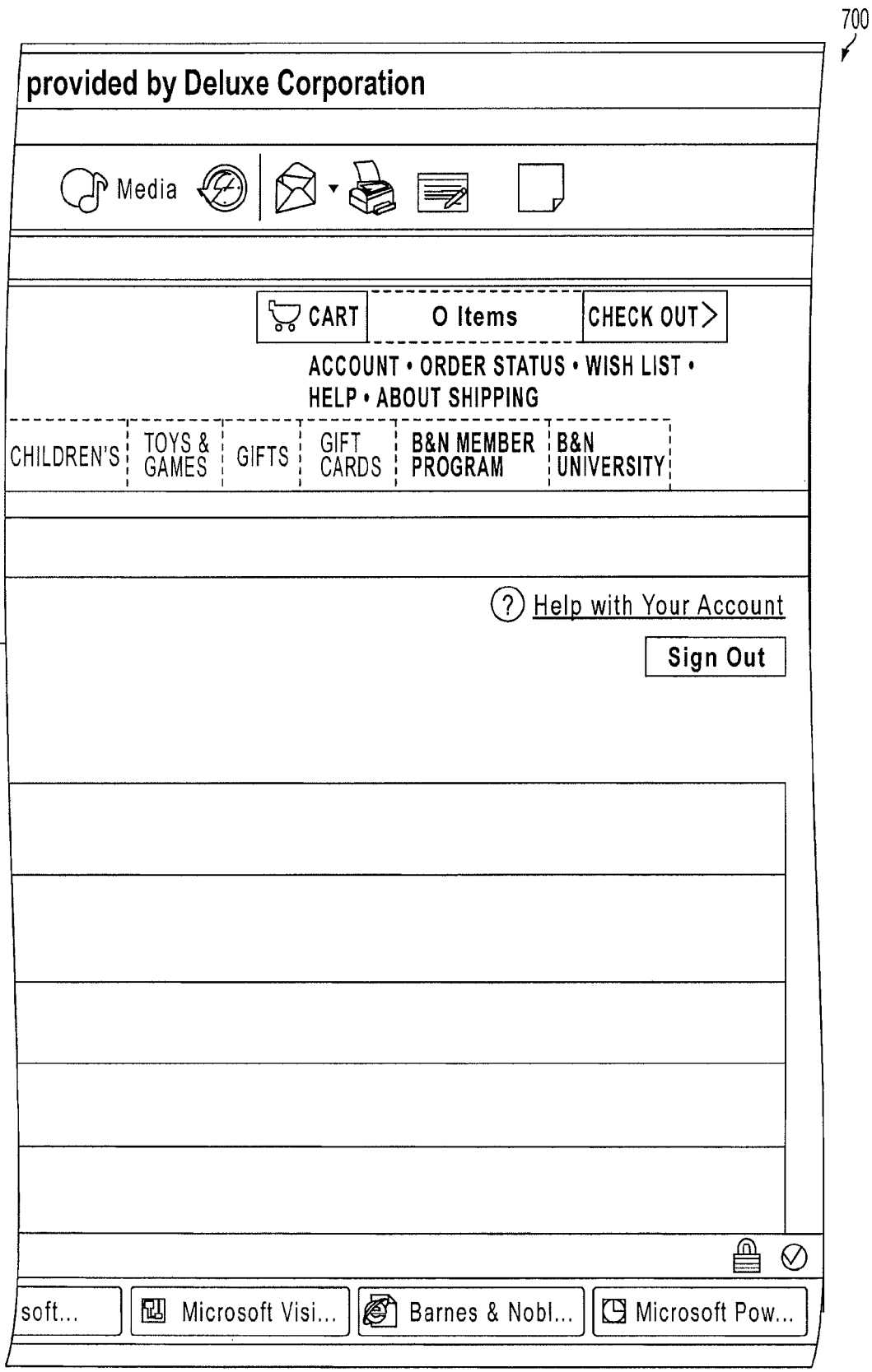

FIGS. 7A and 7B show a screen 700 welcoming John to a secure portion of barnesandnoble.com. For illustration purposes, screen 700 is labeled 115 to indicate that it contains one form of secure data 115 as represented in FIG. 1.

Within home page 500, a user can access any of several different accounts associated with links 510. For instance, the user can access other shopping sites such as flowers.com, ebay.com, secure information sites such as the DMV site, and so on.

Figure 8:
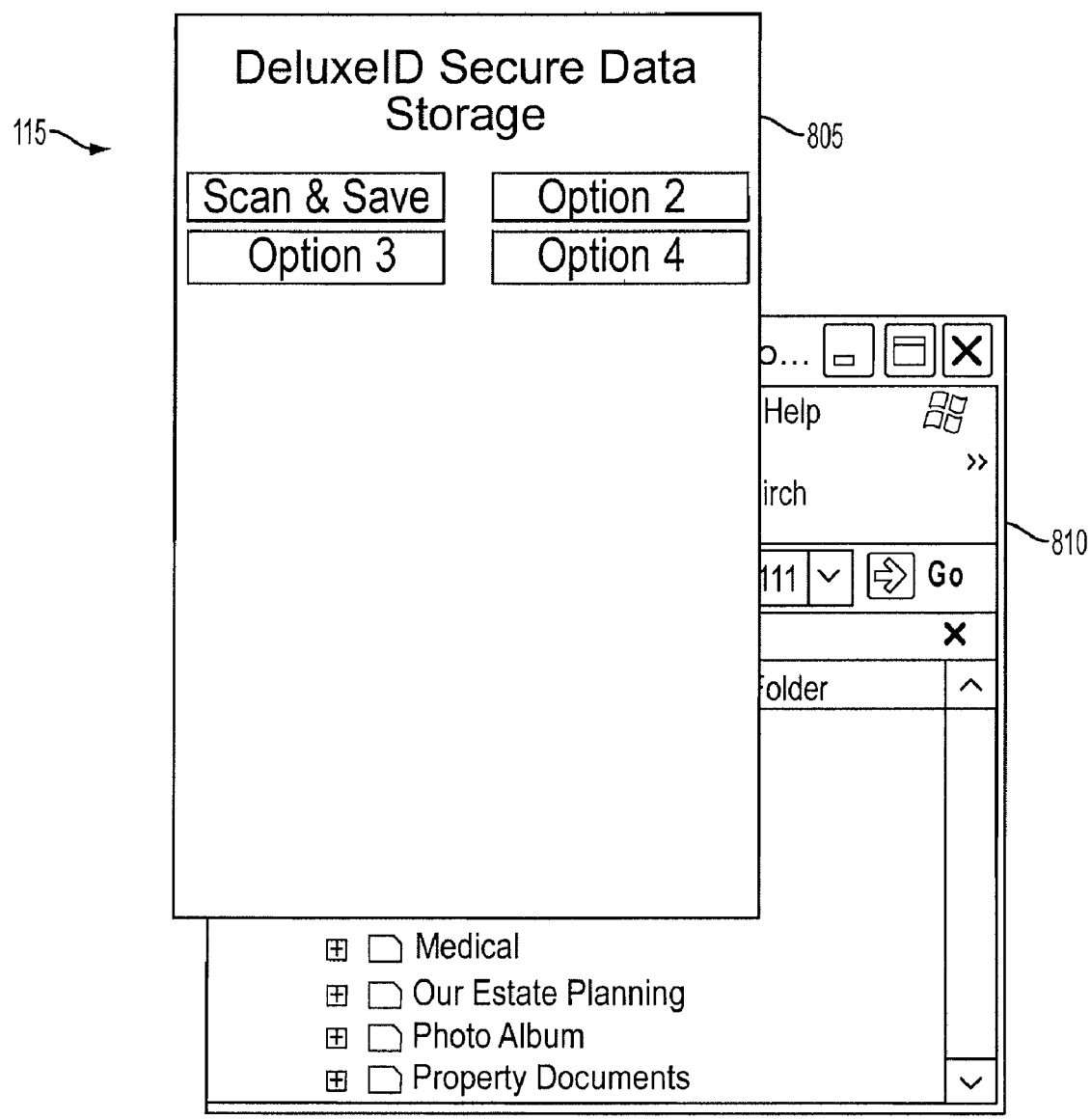
FIGS. 8-10 illustrate secure personal data that can be accessed via the homepage illustrated in FIGS. 5A and 5B.
Figure 9:
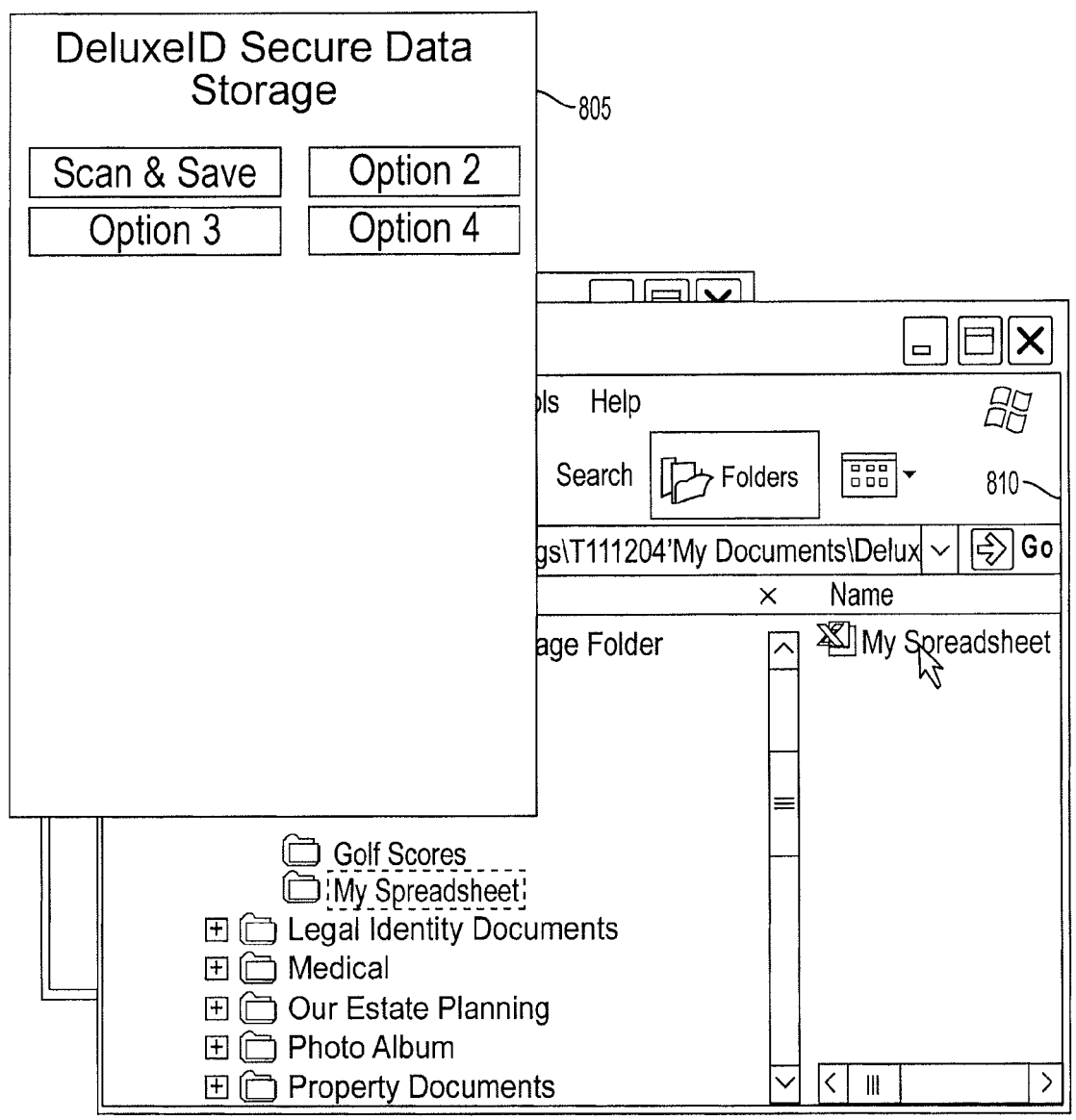
Figure 10:
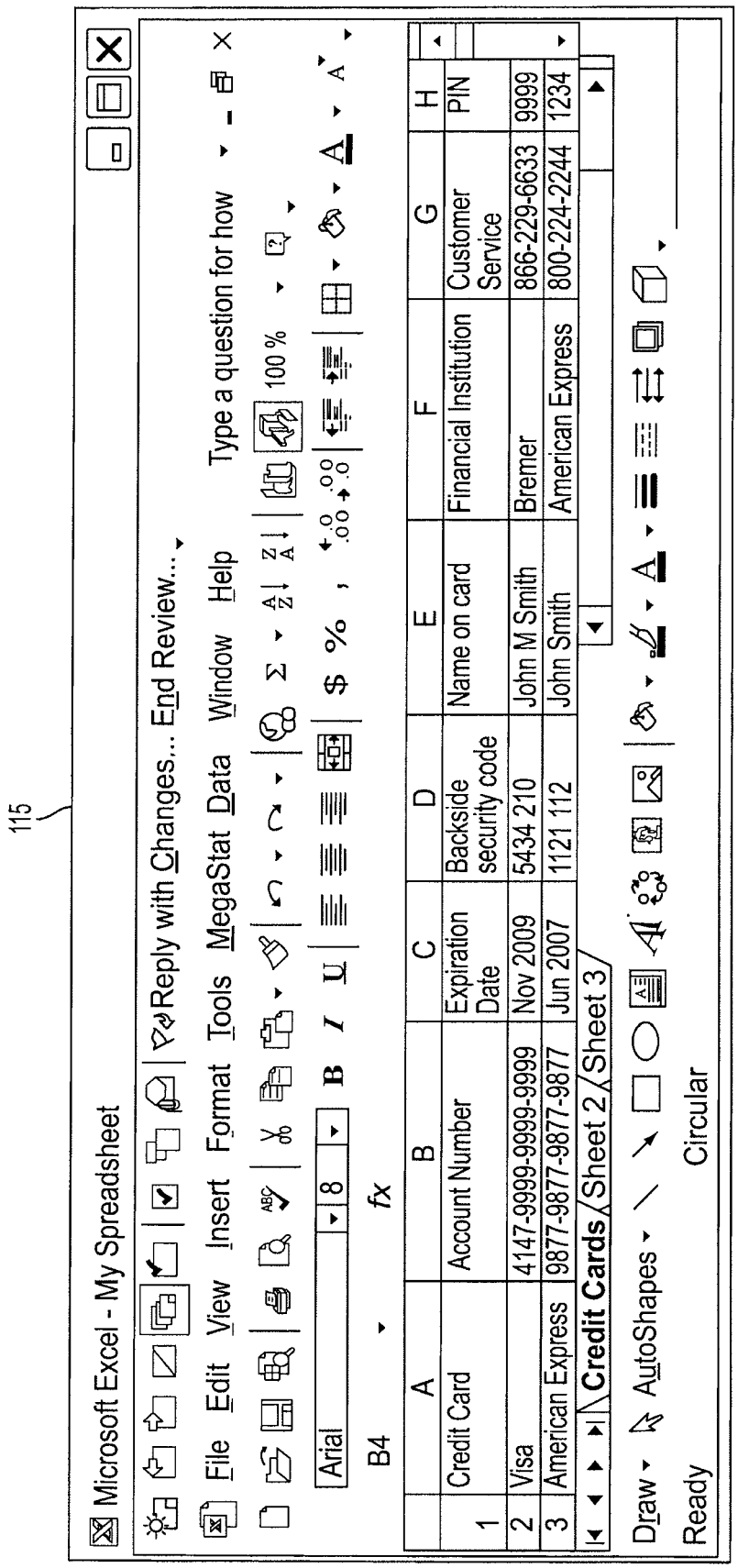

FIGS. 8-11C illustrate an example of accessing secure personal data through lockbox link 520 shown in FIGS. 5A and 5B. FIGS. 8-10 include the reference label 115 to indicate that the secure personal data constitutes an example of secure data such as secure data 115 illustrated in FIG. 1.

Referring to FIG. 8, when a user selects lockbox link 520 from homepage 500, portal 105 displays a control window 805 and an explorer window 810. Explorer window 810 displays secure personal data in a form familiar to Windows users. For instance, explorer window 810 shows the secure personal data in folders that can be expanded to view additional files. Additionally, data can be transferred within and to/from explorer window by familiar actions such as dragging and dropping, cutting and pasting, etc.

Control window 805 provides controls allowing a user to perform additional actions such as adding secure personal data to system 100, or compressing or encrypting the data. One control within control window 805 is a "scan & save" control, which allows a user to submit scanned personal data to system 100. The scan & save feature is described below in further detail with reference to FIG. 12.

To prevent security breaches or data loss, secure personal data is typically stored in a highly secure data storage facility capable of storing and automatically backing up user information. The facility may store the data in an encrypted and/or compressed form, the data may be accessible via a secure single-sign-on portal located anywhere in the World Wide Web, and the facility operate transparently to a consumer.

Figure 11A:
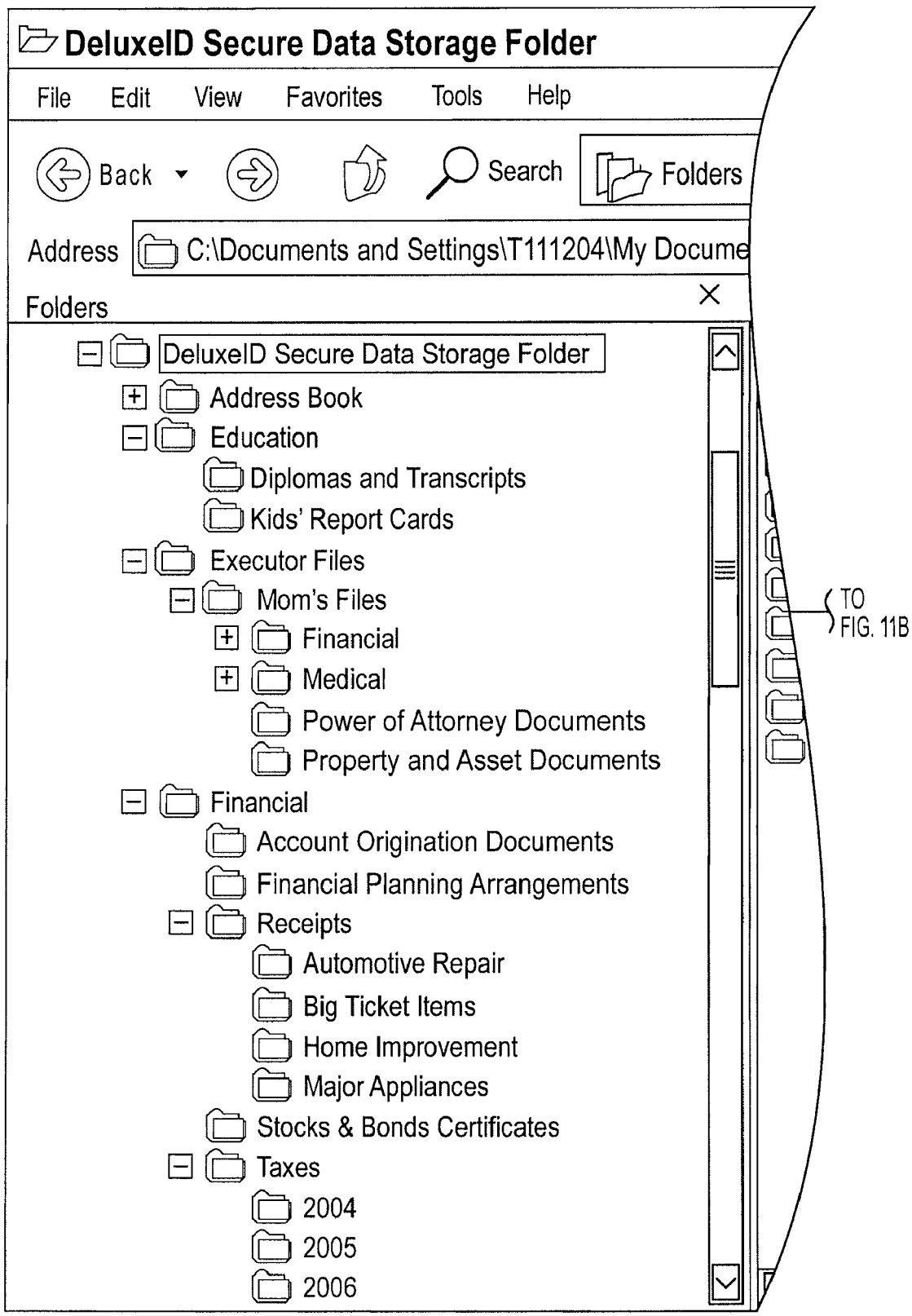
FIGS. 11A-11C show some of these different types of information organized within an explorer window.
Figure 11B:
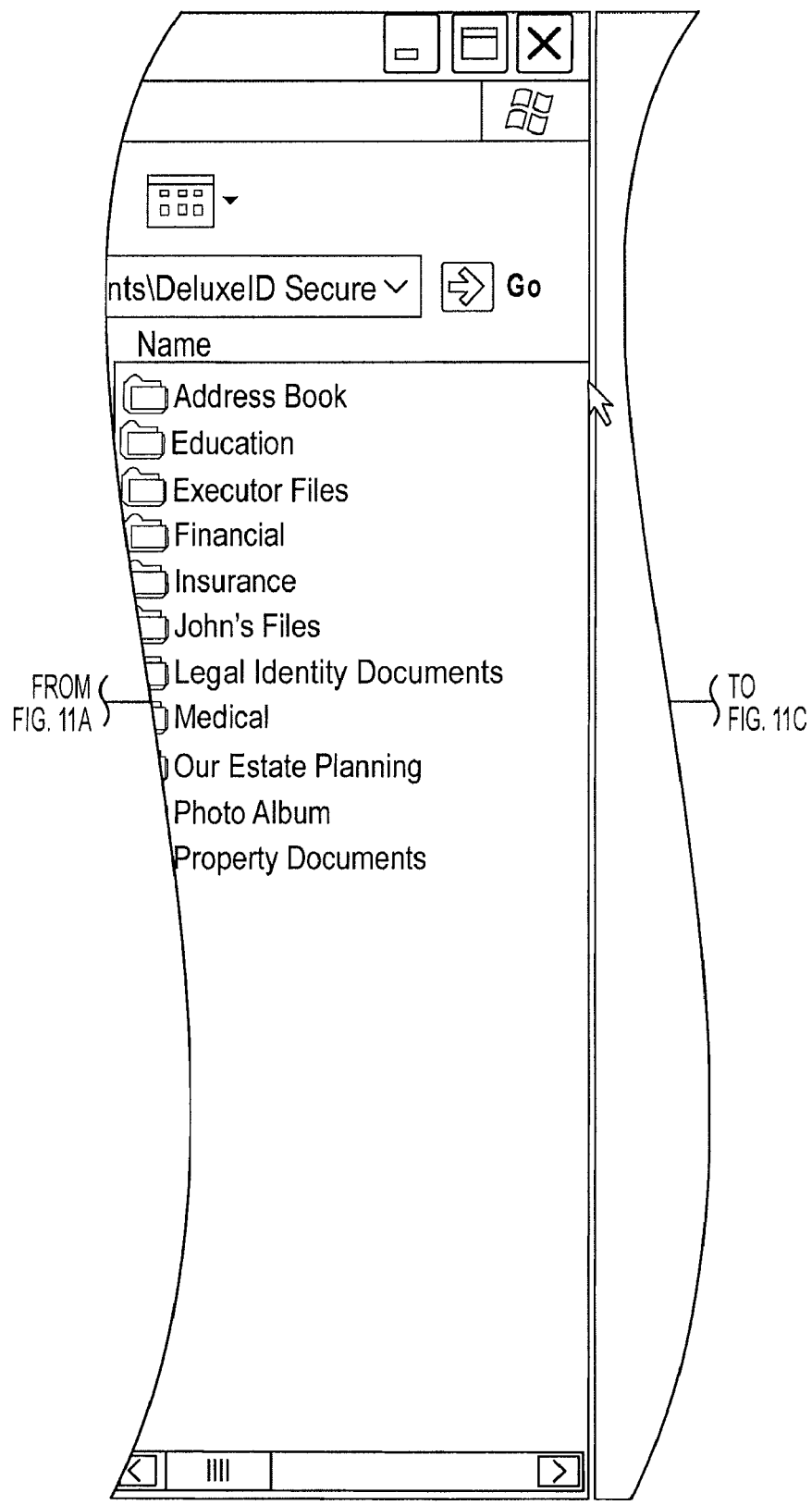
Figure 11C:
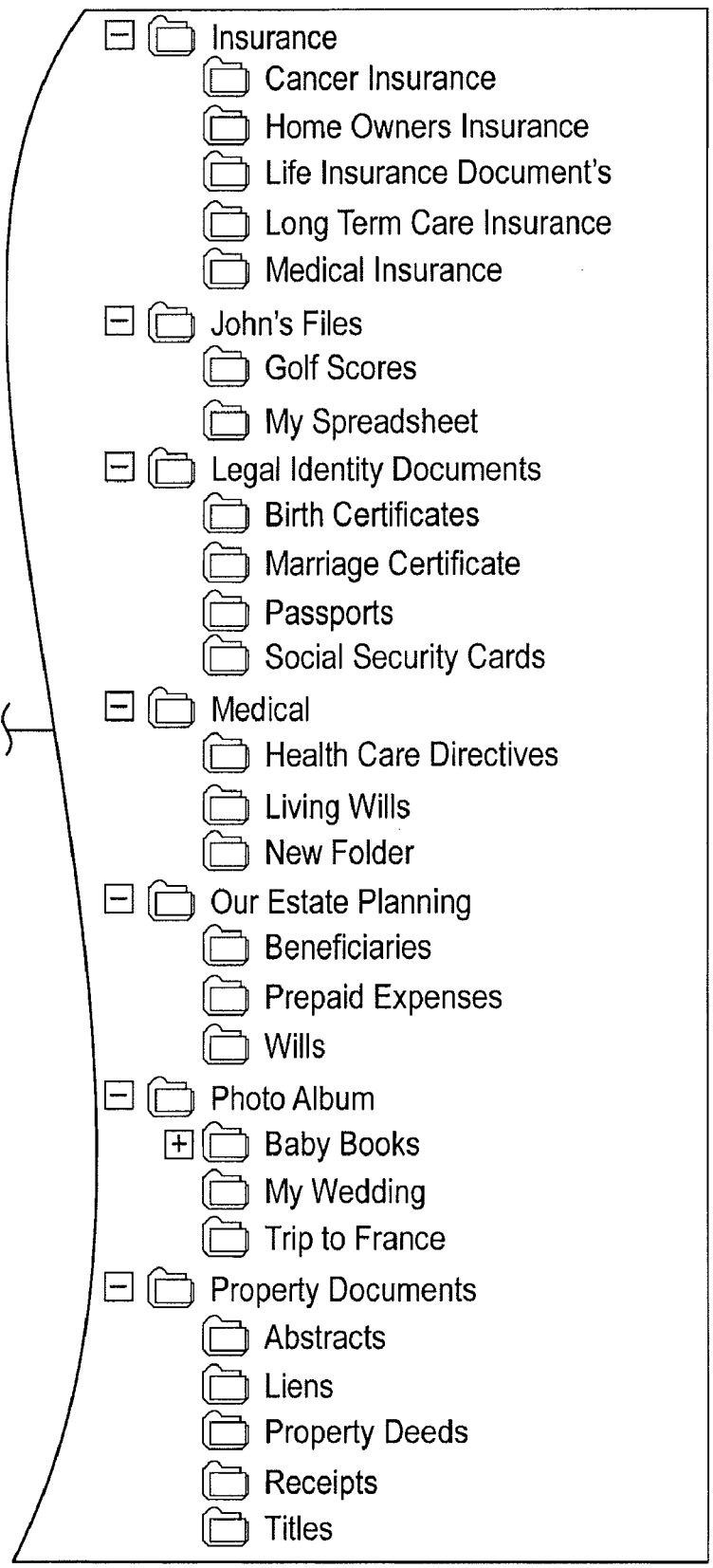

FIG. 9 shows how a user may access a spreadsheet by clicking various icons within explorer window 810, and FIG. 10 shows secure data 115 included within the spreadsheet. In the example of FIGS. 9 and 10, the secure data includes John's personal credit card information. Examples of other types of information that could be stored among the secure personal data include, birth certificates, death certificates, personal photographs, passport copies, work visas, contracts, loan documents, wills, and automobile titles, to name but a few. For illustration purposes, FIGS. 11A-11C show some of these different types of information organized within an explorer window.

FIG. 12 contains a flow diagram illustrating an example method 1200 for uploading information to system 100 via the lockbox feature of home page 500. The method of FIG. 12 allows a user to upload documents from a scanner to a storage facility within system 100 using the scan and save feature of control box 805, which is introduced above in relation to FIG. 8.

Referring to FIG. 12, a user first accesses the lockbox feature by selecting link 520 from home page 500 (1205). The user then scans a document (1210), and invokes the scan and save feature in control box 805 to save the document in system 100(1215). After the user invokes the scan and save function, the user is prompted to identify a destination folder for storing the document. Once the user selects such a location, the document is saved in system 100.

The scan and save feature can be useful for entering a variety of different types of sensitive information into system 100. For instance, the scan and save feature can be used to enter copies of receipts, medical documents, financial statements, and so on.

As discussed above, selected embodiments of the claimed subject matter include various technologies for facilitating convenient access to secure data such as secure internet sites and secure personal data. In several embodiments, a single-sign-on portal authenticates a user by a single-sign-on ID and password and then allows the user to automatically login to multiple secure internet sites based on user IDs and passwords stored in a database associated with the portal. Selected embodiments may provide any of several advantages over conventional technologies, such as eliminating a user's need to remember or frequently update passwords, and maintaining secure information in a highly secure location.

Although specific details have been presented in connection with the above-described embodiments, it should be understood that the details of these embodiments can be modified without departing from the scope of the attached claims.

What is claimed:

1. A computer enabled system comprising:
   a processor;
   a single-sign-on user account accessible by a user providing a corresponding single-sign-on user identifier (ID) and password;
   a set of secure-access internet sites associated with the single-sign-on user account;
   a plurality of user ID and password combinations associated with the set of secure-access internet sites;
   an access component configured to automatically enter the combinations into designated locations of the secure-access internet sites to allow the user to access the sites;
   a user home page displaying links to the secure-access internet sites, wherein the access component operates, in response to a user selection of one of the links, to automatically enter a user ID and password combination into a secure-internet site corresponding to the link, and wherein the home page includes a link to a secure data storage location storing secure personal data associated with the user; and
   a branded portal comprising a graphical user interface adapted to receive the single-sign-on user ID and password, to retrieve the user home page after the single-sign-on user ID and password have been validated, and to provide single-sign-on access to multiple secure services through the branded portal.

2. The system of claim 1, further comprising a scanned document storing component for storing scanned documents within the secure data storage location in response to user inputs to a graphical interface accessible via the user home page.

3. The system of claim 1, wherein the single-sign-on user account requires the user to perform two-factor authentication by providing further authentication information in addition to the single-sign-on ID password.

4. The system of claim 3, wherein the further authentication information comprises one or more of a security code available to the user by a security token, and biometric data.

5. The system of claim 1, further comprising a password updating component for automatic updating passwords associated with individual sites in the set of secure-access internet sites.

6. The system of claim 1, wherein the set of secure-access internet sites comprises one or more sites to which multiple users have access; and
   wherein the one or more sites are included in the set based on a role associated with the user.

7. The system of claim 6, further comprising:
   a user home page displaying links to the secure-access internet sites, wherein the links are displayed in the home page based on the role associated with the user.

8. A non-transitory computer-readable medium storing a secure-sign-on branded portal program configured to pre-fill at least one login name and code combination for at least one secure-access internet site and enabling a brand owner to provide single-sign-on access to multiple secure services through a branded portal, the program comprising code for executing a method comprising:
   judging whether a single-sign-on ID and a single-sign-on password are valid;
   accepting the single-sign-on ID and single-sign-on password when valid;
   accessing a database to pre-fill the combination for at least one secure-access internet site; wherein the database stores the combination as a result of prior activity of a user account associated with the single-sign-on ID and single-sign-on password;
   displaying, via a user home page, links to the at least one secure-access internet site, the user home page including a link to a secure data storage location storing secure personal data associated with the user;

automatically entering, in response to a user selection of one of the links, a user ID and password combination into a secure-internet site corresponding to the link;

receiving, via a branded portal comprising a graphical user interface, the single-sign-on user ID and password; and retrieving the user home page after the single-sign-on user ID and password have been validated.

9. The computer-readable medium of claim 8, wherein the method further comprises:

generating a user home page corresponding to the user account, the user home page including links to the at least one secure-access internet site.

10. The computer-readable medium of claim 9, wherein the method further comprises:

determining a user role based on the single-sign-on ID or single-sign-on password; and generating the home page with links corresponding to one or more accounts shared by the user and one or more additional users, wherein the links are selected based on the user role.

11. The computer-readable medium of claim 8, wherein the method further comprises:

automatically updating the password of the combination based on data transmitted from the secure-access internet site to the portal program.

12. A computer implemented method enabling a brand owner to provide single-sign-on access to multiple secure services through a branded portal, comprising:

receiving a single-sign-on identifier (ID) and password combination via a single-sign-on branded portal;

authenticating, a user based on the combination;

after authenticating the user, receiving a request from the user to access a particular secure-access internet site;

upon receiving the request, accessing, a database storing a plurality of user ID and password combinations for a corresponding plurality of secure-access internet sites, receiving a particular user ID and password combination for the particular secure-access internet site, and automatically filling the particular user ID and password combination into designated portions of the particular secure-access site;

displaying, via a user home page, links to the secure-access internet site, the user home page including a link to a secure data storage location storing secure personal data associated with the user;

automatically entering, in response to a user selection of one of the links, a user ID and password combination into a secure-internet site corresponding to the link;

receiving, via a branded portal comprising a graphical user interface, the single-sign-on user ID and password; and retrieving the user home page after the single-sign-on user ID and password have been validated.

13. The method of claim 12, wherein the combination further includes, in addition to the single-sign-on identifier and password, information for two-factor authentication.

14. The method of claim 13, wherein the information for two-factor authentication includes a security code or biometric data.

15. The method of claim 12, further comprising:

upon authenticating the user, presenting a personalized home page including links to the plurality of secure-access internet sites, wherein the user request is received in response to a user selection of one of the links.

16. The method of claim 15, wherein multiple users share accounts for one or more of the plurality of secure-access internet sites, and the personalized home page is populated with links to one or more of the internet sites corresponding to the shared accounts based on user login profiles stored in the database.

17. The method of claim 12, further comprising:

receiving a request to access secure personal data; and upon receiving the request, generating a graphical user interface providing the user with access to the secure personal data.

18. The method of claim 17, wherein the secure personal data is stored in the database in an encrypted and compressed form.

* * * * *